United States Patent [19]

McCormick

[11] 4,005,020
[45] Jan. 25, 1977

[54] PARAFFIN REMOVING COMPOSITIONS

[75] Inventor: Thomas H. McCormick, St. Louis, Mo.

[73] Assignee: Petrolite Corporation, St. Louis, Mo.

[22] Filed: July 19, 1973

[21] Appl. No.: 380,698

[52] U.S. Cl. .......................... 252/8.55 B; 134/40; 166/304; 252/8.3; 252/529; 252/548

[51] Int. Cl.$^2$ .................... E21B 43/00; B08B 7/00

[58] Field of Search ............... 252/8.3, 855 B, 548, 252/551; 166/304, 312; 134/40

[56] References Cited

UNITED STATES PATENTS

| | | | |
|---|---|---|---|
| 2,470,831 | 5/1949 | Monson | 252/8.55 |
| 2,580,765 | 1/1952 | Hall et al. | 252/8.55 |
| 3,215,200 | 11/1965 | Kirkpatrick et al. | 252/8.55 X |
| 3,271,307 | 9/1966 | Dickson et al. | 166/304 X |
| 3,393,154 | 7/1968 | Treitler | 252/551 X |
| 3,395,757 | 8/1968 | Crossland | 252/8.55 X |
| 3,481,870 | 12/1969 | Cheng et al. | 252/8.3 |
| 3,526,592 | 9/1970 | Quimby | 252/551 X |
| 3,663,476 | 5/1972 | Murphy | 252/548 X |
| 3,897,347 | 7/1975 | Eckert et al. | 252/548 X |

FOREIGN PATENTS OR APPLICATIONS

| | | | |
|---|---|---|---|
| 1,190,577 | 5/1970 | United Kingdom | 252/551 |

Primary Examiner—Herbert B. Guynn
Attorney, Agent, or Firm—Sidney B. Ring; Hyman F. Glass

[57] ABSTRACT

A composition comprising a basic solution of oxyalkylated materials wherein at least one of the oxyalkylated materials is an oxyalkylated amine and at least one of the oxyalkylated materials contains an anionic group. Preferably the oxyalkylated materials are derived from hydroxy-compounds such as phenols, alcohols, etc. and amines such as hydroxyamines for example tris(hydroxymethyl)aminomethane and at least one of the oxyalkylates contains a terminal sulfate group preferably derived from reacting the oxyalkylate with sulfamic acid. Preferably the composition contains a CELLOSOLVE such as butyl CELLOSOLVE. A typical composition which is a solution made basic with trisodium phosphate contains 1. an oxyalkylated alkyl phenol
2. an oxyalkylated tris(hydroxymethyl) aminomethane
3. a sulfated, oxyalkylated fatty alcohol, and
4. butyl CELLOSOLVE.

These compositions are employed as paraffin removers, particularly in petroleum systems.

12 Claims, No Drawings

PARAFFIN REMOVING COMPOSITIONS

In many oil wells, deposits of paraffin, wax, asphaltic and bituminous organic solids and similar materials accumulate in objectionable quantities on the face of the producing formation, on the screen or liner, or in the pump, the casing or the tubing of the well. Such deposits operate to decrease materially the productivity of the wells in which they occur. Similarly, deposits of the same character are found in some oil flow lines and oil pipelines, where they effectively reduce the capacity of the pipes, sometimes to the point where little or no fluid can be passed through such conduits in the normal manner of operation.

The purpose of removing such deposits is obvious. In some areas, wells decline in productivity at a more or less rapid rate, because of deposition of such deposits on the face of the producing formation. In some cases, the decline is sufficiently rapid that the wells must be serviced in some manner or other at a frequency ranging from several days to several weeks. In some instances, the deposition is so slow that servicing at long intervals is sufficient to maintain the well at a satisfactory level of productivity. The same is true of the various conduits through which the oil travels from the well to the refinery; such as for example through tank batteries, tank farms, pipes, etc.; and periodic servicing of such elements is also required. The capacity of a conduit of circular cross-section is reduced greatly by such deposits, usually well beyond the reduction expected from the ratio of effective cross-sectional areas of the conduit and the fouled conduit. Where organic deposits of the present type occur on formation walls, well productivity may fall substantially to zero, especially in low-pressure fields. Pipe capacities are frequently reduced to a small fraction of their capacities when clean. Ultimately such pipes may be found completely clogged by such deposits. In the case of pipelines, for example, the operator may find himself burdened with the cost of a 6 or 8 inch line, yet benefiting from a capacity equal to that of a 3 or 4 inch line. Tank capacities are also reduced by such deposits.

The process which constitutes the present invention consists in subjecting such clogging organic deposits of wax, paraffin, asphaltic or bituminous substances and the like, to the action of a chemical reagent of the character described below, to the end that such deposits are removed from the surfaces to which they were originally adherent. By means of the process, the productivity of wells is restored as is the capacity of flow lines, pipelines, traps, tanks, pumps, and other equipment, through which such oil travels from formation to refinery.

It will be obvious that, if the first minute deposit of such organic materials is subjected to this reagent, and if such application of reagent is practised continuously or periodically with sufficient frequency, the operation is a preventive or inhibitive process rather than a corrective process. In addition, it should be noted that the reagent has a more real claim to acting as a preventive, in that surfaces effectively cleaned by its application tend to resist renewed deposition of such materials, and to remain clean and operative for longer periods than if the reagent had not been applied. Therefore, the present process is both a preventive and a corrective one. It may obviously be applied in either sense, and achieve the same ultimate goal, the improvement of efficiency of operation of wells and equipment. Thus, when I have used the word "removing," it should be clearly understood to include the prevention of organic deposits of the present kind.

This reagent may be applied in a large number of different ways, depending upon the character of the organic material deposit it is desired to remove and on the location of such deposit. If the productivity of a well has declined to undesirably low levels and the clogging deposit is found at the formation, it may be preferable to introduce the reagent into the fluids being produced from the well, and then tie the tubing back into the casing of the well, and circulate the fluids being produced. In this manner chemicalized well fluids are passed over the deposit for a period of from several hours to several days, usually with a striking improvement in well productivity when circulation is stopped and normal production of the well is resumed. In other cases circulation may not be desirable.

Sometimes the deposit is located at some higher or lower level in the tubing. For example, passage of the well fluids past a point in the well which lies opposite a water sand may produce a deposit at that point, because such a water sand commonly represents a point of cooling. In treating tubing deposits, the circulation method above may be practiced. However, in some instances, it is possible to introduce the reagent in undiluted or diluted form into the tubing at the well head by unscrewing the stuffing box. (Usually the tubing does not stand entirely full of fluid, because of slight leakage past the pump.) Where the reagent is introduced with large amounts of water, it will settle relatively slowly down through the oil in the tubing until it reaches the deposit. After introducing the reagent in any desirable manner, it may be allowed to stand in the tubing for any desired period of time before the well is replaced on production. In some instances it may be advisable to pump the well intermittently for very short periods of time, so as to pick up the reagent and lift it above the deposit, letting it settle down past the deposit again during the next idle period. However, one of the advantageous factors of this reagent is that it does not require shutting the well down if one so desires.

Where the organic deposits in question occur in flow lines, the reagent may be introduced and allowed to "soak" the deposit. Thereafter, normal production may be resumed; and the dislodged deposit flushed from the line by the flow of well fluids. In other instances, gas pressure is put on the soaked line, and the deposit flushed out in that manner. Sometimes, introduction of a dilute aqueous solution of the reagent is effected intermittently and the deposit progressively removed. Or the reagent may be introduced in a continuous fashion, if desired.

In the case of pipelines, the diameter of the pipe and the length of the line make it necessary to apply the reagent in the most economical fashion possible. In such cases it has been found that aqueous dilutions thereof are useful. Soaking of the line, i.e., merely introducing the diluted reagent into it and allowing the line to lie idle for a period of time, is practicable. Sometimes one prefers to prepare a relatively large volume of diluted reagent in a tank at some convenient location at one end of the pipeline, and interrupt the pumping of oil only long enough to switch to the solution tank and pump the volume of reagent dispersion into the line. Then the pumping of oil is resumed, and the liquid cylinder of reagent dispersion is thereby moved across the face of the deposit in the line, over the whole length of line. If desired, the direction of pumping may be reversed when such liquid cylinder of reagent dispersion reaches the opposite end of the line; and a second, or even a third pass or more may be made, of the diluted reagent over the deposit in the line.

Where deposits have been allowed to accumulate over a considerable period of time, they may be of such proportions that application of a normal amount of this reagent would produce sloughing of sufficient of the deposit to plug the conduit further downstream, by forming a bridge with undislodged deposit at that point. In such instances, one prefers to proceed more cautiously, introducing successive small portions of reagent and successively dislodging portions of the deposit which are sufficiently small to pass freely through the limited freeway in the conduit.

Merely introducing the reagent into an area containing a deposit, so the reagent contacts the deposit, is sometimes sufficient to cause the removal of the latter. Sometimes agitation of the reagent at the face of the deposit greatly accelerates removal of the latter. Any suitable agitation means may be employed in such instances.

Application of the reagent upstream in any system, as, for example, into a well, results in an attack on any such organic deposits further downstream. For example, wax or similar deposits, in traps and tanks, are freed and usually flowed out of such vessels in subsequent operation of the system. In the case of tanks it has been found that waxy tank bottoms may be removed by introducing the reagent into the tank containing such deposits and allowing the whole to soak for any desired period of time. The deposit is thereby made more free and more readily removable. Removal of deposits of organic matter from oil production equipment, such as traps and tanks and the like, is obviously contemplated by this process.

Because there are so many conditions under which such organic deposits may occur, it is difficult to give any preferred procedure for applying the reagent. The foregoing descriptions have covered instances where such deposits were to be removed from the face of the formation, the well tubing or casing, flow lines, pipelines and tank batteries. They may be taken as preferred methods of operating the process for the respective conditions outlined. All of them are exemplary only. The process may be varied as conditions may require. In all cases, the process consists broadly in the application of the reagent to the organic deposits described above.

The compositions employed as reagents of this invention are characterized as basic solutions of oxyalkylated materials wherein at least one of the oxyalkylated materials is an oxyalkylated amine and at least one of the oxyalkylated materials contains an anionic group. Preferably the oxyalkylated materials are derived from hydroxy-compounds such as phenols, alcohols, etc. and amines such as hydroxyamines for example tris(hydroxymethyl)aminomethane and at least one of the oxyalkylates contains a terminal sulfate group preferably derived from reacting the oxyalkylate with sulfamic acid. Preferably the composition contains a cellosolve such as butyl cellosolve. A typical composition which is a solution made basic with trisodium phosphate contains 1. an oxyalkylated alkyl phenol
2. an oxyalkylated tris(hydroxymethyl)aminomethane
3. a sulfated, oxyalkylated fatty alcohol and
4. butyl cellosolve.

These compositions are employed as paraffin removers, particularly in petroleum systems.

Any oxyalkylatable mono-, poly-, cyclic-, heterocyclic, etc. amine can be oxyalkylated according to this invention to place $(OA)_n$ units herein, where OA represents the alkylene oxide derived radical of a unit where $a$ can be, for example, 1–10,000 or more, such as 1–5,000, for example 1–2,000, but preferably 1–1,000.

Oxyalkylated amines may be represented by the formula

where 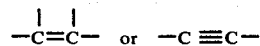 represents the amine moiety which originally contained at least one oxyalkylatable group. $(OA)_nH$ represents the oxyalkyl group and q is a number representing the number of oxyalkyl groups.

The following are non-limiting examples of amines that can be oxyalkylated to yield compounds of this invention.

I. Monoamines

A. Primary monoamines. These include compounds of the formula $R-NH_2$, where R is a substituted group preferably a hydrocarbon group, for example alkyl, cycloalkyl, aryl, alkenyl, heterocyclic, substituted derivatives of the above, etc.

ALKYL

Alkyl includes methyl, ethyl, propyl, butyl, amyl, hexyl, heptyl, octyl, nonyl, decyl, undecyl, dodecyl, tridecyl, tetradecyl, pentadecyl, hexadecyl, octadecyl, eicosyl, docosyl, etc. having 1–50 or more carbons, such as 1–30, but preferably 1–18 carbons.

The term "alkyl" also includes isomers of the straight chain group wherein branching occurs along the chain, for example

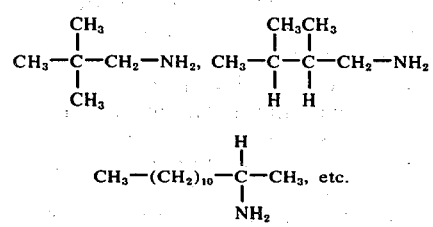

ALKENYL AND ALKINYL

These include unsaturated analogues of alkyl groups containing one or more $$-\overset{|}{C}=\overset{|}{C}- \quad \text{or} \quad -C\equiv C-$$

groups, for example decenyl, dodecenyl, tridecenyl, tetradecenyl, pentadecenyl, hexadecenyl, heptadecenyl, octadecenyl, etc., dienes for example octadienyl, etc. trienes, for example octatrienyl, etc., alkinyl, for example, butinyl, etc.

CYCLOALKYL

These include

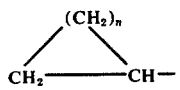

for example cyclobutyl, cyclopentyl, cyclohexyl, cycloheptyl, cyclooctyl, etc.; substituted derivatives thereof, for example alkyl or polyalkyl, for example alkyl cyclohexyl, dialkyl cyclohexyl, etc.

ARYL

These include phenyl, substituted phenyl, alkyl phenyl, polyalkylphenyl, chlorophenyl, alkoxyphenyl, etc., naphthyl, alkyl naphthyl, etc.; benzyl, substituted benzyl, etc. groups.

HETEROCYCLIC

These include furyl, pyranyl, hydrogenated furyl, pyranyl, etc. groups.

B. Secondary amines. These include amines of the formula

where R and R', which may or may not be the same, have the same meaning as stated above, for example dimethyl amine, diethyl amine, dipropyl amine, diamylamine, dihexyl amine, dioctyl amine, didodecyl amine, dihexyldecyl amine, etc., methyl ethyl amine, methyl octyl amine, butyl octylamine, methyl octadecyl amine, etc.; methyl octadecenyl amine, dioctadecenyl amine, etc.; dicyclohexyl amine, methyl cyclohexyl amine, etc.; methyl furyl amine, methyl benzyl amine.

C. Tertiary amines. These include amines of the formula

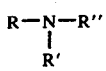

where the R's, which may or may not be the same, have the same meaning as stated above, for example, trimethyl amine, triethyl amine, dimethyl octyl, dimethyl dodecyl, dimethyl tetradecyl, diethyl hexadecyl, methyl ethyl octadecyl, dimethyl octadecyl, etc., dimethyl octadecenyl, diethyl hexadecenyl, etc. dodcyl benzyl methyl, decyl dibenzyl, etc.; dimethyl furyl, etc., dimethyl phenyl, diethyl naphthyl, etc., dicyclohexyl methyl, dimethyl cyclohexyl, etc.

D. Commercial amines Representative commercial amines are available, for example, these shown in the following tables.

The nomenclature of these amines is derived from either their chain length or source of raw material, for example,
Armeen 8D-octyl amine
Armeen C-coconut oil amine
Armeen S-soybean oil amine
Armeen T-tallow amine
Armeen O-oleyl amine
Armeen HT-hydrogenated tallow amine
Armeen DMCD-dihydrogenated tallow amine
Armeen M2HT-dimethyl coconut oil amine.

Products with "D" designate distilled grade. Products without "D" designate technical grade.

Other commercial amines include the following:
"Primene" amines

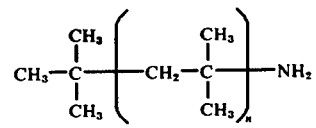

Rosin Amine D

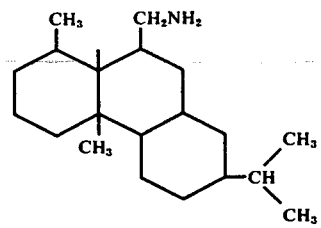

E. Cyclic secondary and tertiary amines. Also included within the definition of secondary and tertiary amines are those amines where two of the R groups are joined in a cyclic structure such as

Examples of these amines include pyridine, quinoline, isoquinoline, acridine, piperidine, piperazine, morpholine, etc. Certain N-substituted derivatives thereof, such as N-alkyl morpholine, N-alkyl piperidine, N-alkyl piperidine, etc., for example
N-dodecylmorpholine,
N-octadecylmorpholine,
N-dodecylbenzylmorpholine,
N-nonylmethylbenzylmorpholine,
N-cetylpiperidine,
Octylphenyoxyethoxyethylmorpholine,
Nonylphenoxyethoxyethylpiperidine,

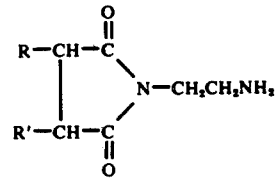

II. Polyamines

These include polyamines corresponding to the formula

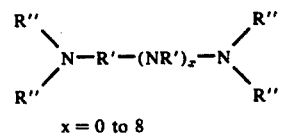

$x = 0$ to $8$ in which R'' (which may or may not be the same) is hydrogen, alkyl, cycloalkyl, aryl, or aralkyl and R' is a divalent radical such as

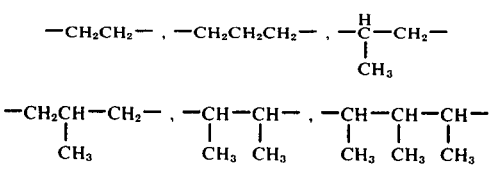

etc.
Ethylenediamine
Diethylenetriamine
Triethylenetetramine
Tetraethylenepentamine
Propylenediamine
Dipropylenetriamine
Tripropylenetetramine
Butylenediamine
Aminoethylpropylenediamine
Aminoethylbutylenediamine

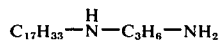

Other polyamines in which the nitrogen atoms are separated by a carbon chain having 4 or more carbon atoms include the following: Tetramethylenediamine, pentamethylenediamine, and especially hexamethylenediamine.

Another class of polyamines which may be employed are those sold under the trademark "Duomeen" which is a designation for certain diamines. "Duomeen" amines have the following general formula:

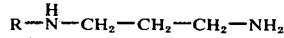

R is an alkyl group derived from a fatty acid or from the mixed fatty acids as obtained from certain oils. The specific "Duomeen" and the source of the radical R are as follows:
1. "Duomeen" 12, R=lauric
2. "Duomeen" C, R=coconut oil fatty acid
3. Similarly, a comparable diamine, obtained from Rosin Amine D and acrylonitrile, can be prepared.

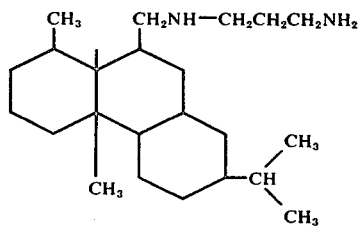

Additional examples of polyamines include the following:

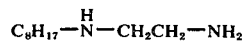

N-octyl ethylenediamine

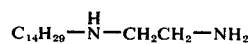

N-tetradecyl ethylenediamine

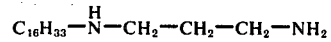

N-hexadecylethylenediamine

N-dodecyl triethylenetetramine

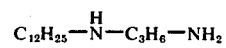

N-dodecyl propylenediamine
Diamines containing tertiary amino groups for example

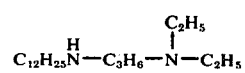

It is to be noted that the above examples show high molal groups, i.e., 8 carbon atoms or more. The same derivatives in which methyl, ethyl, propyl, butyl, amyl, hexyl groups, or the like, appear instead of octyl, decyl, etc., are equally satisfactory.

Acylated polyamines can also be employed provided they are sufficiently basic to form salts, for example:

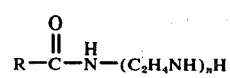
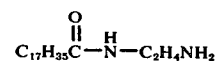
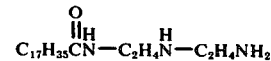
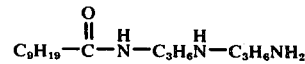
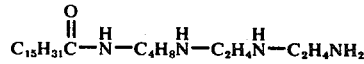
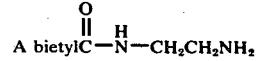
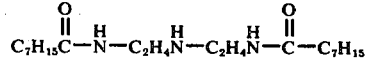
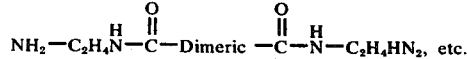

The amines oxyalkylated may or may not contain other groups besides amino group. For example they may contain both hydroxy and amino group. Thus, any of the amines disclosed herein may be hydroxyl amines, for example, alkanol amines of monoamines, polyamines, and any other amine for example
ethanolamine
diethanolamine triethanolamine
isopropanolamine
aminopropanol
aminobutanol, etc.

In addition, other hydroxyl amines may be oxyalkylated, for example, the preferred amine, namely tris(hydroxymethyl) amino methane.

A wide variety of oxyalkylated materials can be employed in this invention. In general, the oxyalkylates employed are compounds of the general formula $$Z[(OA)_nH]_z$$

wherein Z is the oxyalkylatable material, A is the radical derived from the alkylene oxide which can be, for example, ethylene, propylene, butylene oxide, etc., and the like, n is a number determined by the moles of alkylene oxide reacted, for example 1 to 10,000 or more and z is a whole number determined by the number of reactive oxyalkylatable groups. Where only one group is oxyalkylatable as in the case of a substituted or unsubstituted monofunctional phenol, a straight chain biodegradable alcohol, or a branched-chain alcohol, then 2=1. It is known that normal alcohols are biodegradable-such as, those obtained by saponification of natural waxes such as sperm oil, those obtained by reduction of fatty acids derived from coconut oil, palm kernel oil, or tallow and those obtained from petroleum sources, such as for example, the mixtures of $C_{10}$ through $C_{18}$ straight-chain primary alcohols now commercially available from Continental Oil Co. Where Z is water, or a glycol, z=2. Where Z is glycerol, z=3, etc.

As is well known, alkylene oxides can be reacted with various oxyalkylatable materials (i.e., materials which contain hydrogen atoms capable of reacting with a 1,2-alkylene oxide) to form a polyalkylene oxide derivatives thereof. Thus, where an oxyalkylatable material of the formula $ZH_z$ is reacted with an alkylene oxide such as ethylene oxide, there is obtained a compound of the formula $$Z[(OA)_nH]z$$

such as $$Z[(OCH_2\text{-}CH_2)_nH]z$$

where n is a number determined by the moles of alkylene oxide reacted and z is a number determined by the compounds oxyalkylatable hydrogens.

Many polyalkylene oxide block polymers have been prepared containing definite homogeneous block units or segments of ethylene oxide, propylene oxide, butylene oxide, etc., such as disclosed in U.S. Pat. Nos. 2,674,619, 2,677,700 and elsewhere.

Where ethylene oxide is reacted with water, a polymeric polyethylene glycol of the type $$H(OEt)_n\text{-}O\text{-}(EtO)_nH$$

is formed. Similarly, where propylene oxide is reacted with water, a polymeric polypropylene glycol of the type $H(OPr)_nH$ is formed. When water is first reacted with ethylene oxide followed by reaction with propylene oxide, a polymer containing blocks of ethylene oxide units and blocks of propylene oxide are formed, $H(PRr)_m(OEt)_nO\text{-}(EtO)_n(PrO)_mH$, or when added in the reverse order the following block polymer is formed:

$$H(OEt)_m(OPr)_nO(PrO)_n(EtO)_mH$$

Block polymers of this type can be formed by adding infinite numbers of block units, for example $H(OPr)_y(OEt)_x(OPr)_m(OEt)_n$ $$\text{—}O\text{-}(EtO)_n(PrO)_m(EtO)_x(PrO)_yH$$

This block-wise or sequential addition could be continued infinitely. Since only two types of alkylene oxides are employed, these polymers are di-block polymers.

Where three or more different types of alkylene oxides are employed, ter-block polymers are formed as illustrated by sequentially adding ethylene oxide, propylene oxides, and butylene oxides to water to form:

$$H(OBu)_x(OPr)_m(OEt)_n\text{-}O\text{-}(EtO)_n(PrO)_m(BuO)_xH$$

These ter-block units may also be contained infinitely. Where, for example, other alkylene oxides are used in addition to ethylene propylene and butylene oxides, a higher type of block polymer is formed, such as when octylene oxide or styrene oxide are additionally reacted. It is to be noted the block units of these polymers within themselves are homogeneous units, i.e., each block is derived from a single alkylene oxide.

Polyalkylene oxides have also been prepared by reacting mixtures of alkylene oxide such as when a mixture of ethylene oxide and propylene oxide are reacted. When this is done, a random of hetero-polymer is obtained. Thus, for example, where a 50/50 molar mixture of Eto and PrO are reacted with an oxyalkylatable material, such as water, one obtains a polymer having no orderly arrangement of the alkylene oxide units since the distribution of EtO and PrO units in the molecule is random may be designated by

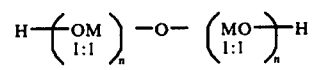

where MO represents a random distribution of EtO and PrO units such as, for example
$H(OPr)_6(OEt)_2(OPr)_4(OEt)_2(OPr)_2$—

—$O\text{-}(EtO)(PrO)(EtO)_2(PrO)_3(EtO)(PrO)$

Carbide & Carbon sells these mixed glycols under the "Ucon" trademark.

"MO" as employed herein refers to mixtures of ethylene oxide in conjunction with a hydrophobic alkylene oxide, i.e., an alkylene oxide having more than two carbon atoms. Thus, the hydrophobic alkylene oxides include propylene oxide, butylene oxide, amylene oxide, octylene oxide, styrene oxide, methylstyrene oxide, cyclohexene oxide, etc. However, in practice I prefer to employ ethylene oxide in conjunction with propylene and/or butylene oxide.

The alkylene oxides employed herein are 1,2-alkylene oxides of the formula

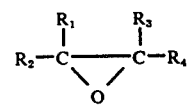

wherein $R_1$, $R_2$, $R_3$, and $R_4$ are selected from the group consisting of hydrogen, an aliphatic, cycloaliphatic, aryl, etc. group for example ethylene oxide, propylene oxide, butylene oxide, amylene oxide, octylene oxide, styrene oxide, methylstyrene oxide, cyclohexene oxide, (where R and $R_3$ are joined to make a ring), etc.

Equivalents of alkylene oxides can also be employed, for example alkylene carbonates, i.e. ethylene carbonate, propylene carbonate, butylene carbonate, etc. In addition, alkylene oxides of the glycide, methyl glycide type can also be employed.

Some of the products of this invention are block polymers containing blocks or segments of alkylene oxide units which are added sequentially, the reaction is in essence a stepwise procedure. Examples include the following:

(1) Oxyalkylatable monofunctional compounds such as alcohols of the $C_nH_{2n+1}OH$ series for example methanol, propanol, butanol, pentanol, hexanol, octanol, nonanol, decanol, undecanol, dodecanol, tridecanol, tetradecanol, pentadecanol, hexadecanol, heptadecanol, octadecanol, etc. (2) Corresponding unsaturated alcohols, for example oleyl, linoleyl alcohols, (3) phenolic compounds including those of the general formula

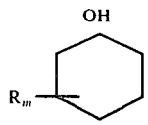

where R is hydrogen or a substituted group for example those of the $C_nH_{2n+1}$ series, i.e. methyl, ethyl, propyl, butyl, etc., corresponding unsaturated radicals: phenyl, substituted phenyl, etc., and $m$ is an integer for example 1–3, but preferably 1.

In addition condensed ring aromatic compounds can be employed, for example, naphthol, substituted naphthol, etc.

Polyols can also be employed as exemplified by the following:

a.

Polyhydric alcohols
Ethylene glycol
Propylene glycol
Diethylene glycol
Trimethylene glycol
2,3-butanediol
1,4-dihydroxy-2-butene
1,12-dihydroxy octadecane
1,4-dihydroxy cyclohexane
2,2-dimethyl-1,3-propanediol
2-ethyl-2-butyl propanediol-1,3
Glycerol
Erythritol
Sorbitol
Mannitol
Inositol
Trimethylol propane
Pentaerythritol
Polyallyl alcohol
Bis(4-hydroxycyclohexyl) dimethyl methane
1,4-dimethylol benzene
4,4'-dimethylol diphenyl
Dimethylol xylenes
Dimethylol naphthalenes, etc.

b.

Polyhydric ether alcohols
Diglycerol
Triglycerol
Dipentaerythritol
Dimethylolanisoles
Beta hydroxyethyl ethers of polyhydric alcohols and phenols such as diethylene glycol, polyethylene glycols
Bis(beta hydroxyethyl ether) of hydroquinone
Bis(beta hydroxyethyl ether) of bisphenol
Beta hydroxyethyl ethers of glycerol, pentaerythritol, sorbitol, mannitol, etc.
Condensates of alkylene oxides such as ethylene oxide; propylene oxides; butylene oxide; isobutylene oxide; glycidol; glycid ethers, etc. with polyhydric alcohols such as the foregoing.

c.

Polyhydric phenols
Hydroquinone
Resorcinol
Pyrogallol
Bisphenol (predominantly 4,4'-dihydroxy diphenyl dimethyl methane)
Dihydroxy diaryl sulfones d.

Phenol-aldehyde resins
(See U.S. Pat. No. 2,499,365)

The moles of alkylene oxide on each block unit can also vary widely, such as from 1–10,000 moles, or more, of alkylene oxide, for example, a range of 1–2,000 moles but preferably 1–500 moles per block unit. However, the range of the specific preferred block unit will vary with the specific surfactant molecule and with the system in which the surfactant is employed.

The preferred composition is an aqueous solution of an oxyalkylated alkyl phenol, a cellosolve such as butyl cellosolve, an oxyalkylated tris (hydroxymethyl) amino methane, and a sulfated oxyalkylated straight chained alcohol. The solution is preferably made basic with a phosphate such as trisodium phosphate, a polyphosphate salt, etc.

In the preferred embodiment, the compositions of this invention comprise three classes of oxyalkylates:
1. Non-ionic oxyalkylates
   a. An oxyalkylated hydrocarbon substituted phenol, for example, of the general formula

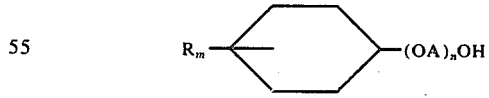

where R is substituted group, preferably hydrocarbon, preferably aliphatic, and most preferably alkyl having about 1–18 carbons, such as about 6–12 and most preferably about 8–10 carbons with an optimum of about 9 carbons; and $m$ is 1–3 and preferably 1 or 2, and most preferably 1. The type of alkylene oxide is preferably ethylene oxide having $n$ units, where $n$ is about 1–25, such as about 4–15, and most preferably about 8–12 with an optimum of about 10.

b. A cellosolve such as butyl cellosolve

Butyl-OCH$_2$CH$_2$OH

2. An oxyalkylated amine, preferably where the oxyalkylated amine is an oxyalkylated tris(hydroxymethyl) amino alkane, most preferably tris(hydroxymethyl) amino methane. In the preferred embodiment the oxyalkylate group contains both a hydrophobic alkylene oxide, i.e., an alkylene oxide other than ethylene oxide, i.e., PrO, BuO, or higher oxides as well as a hydrophilic oxide, i.e., EtO. In general, the molar ratio of hydrophobic oxide to hydrophilic oxide is at least about 2:1 such as about 2.5:1 but preferably about 2.4:1. In the preferred embodiment all of the PrO is added prior to EtO. The total moles of alkylene oxide added are for example at least about 80, such as for 100–200, but preferably 105–110, with an optimum of about 108.

3. An anionic oxyalkylate. In the preferred embodiment the oxyalkylated material is a fatty alcohol having about 6–18 carbons, such as from about 8–14 carbons, for example about 8–12 carbons, but preferably about 8–10 carbons. The preferred alcohols are "Alfol" alcohols which are straight chain alcohols. These oxyalkylates are rendered anionic by converting the terminal hydroxyl group to a sulfate group or a salt thereof. This is conveniently effected by reacting the oxyalkylated alcohol with sulfamic acid to form the ammonium salt of the sulfate of the oxyalkylate.

The particular ratio of components will depend on a wide variety of factors, for example, the specific component employed, the system in which it is employed, etc. The following illustrates the ratio which can be employed.

|   | | Operable Range | Preferred Range | Optimum Range |
|---|---|---|---|---|
| 1 | Oxyalkylated Phenol | 15% – 50% | < 30% | 24% ± 5 |
| 2 | Butyl cellosolve | 5% – 30% | < 20% | 10% ± 5 |
| 3 | Oxyalkylated amine | 15% – 65% | > 20% | 35% ± 10 |
| 4 | Sulfated, oxyalkylated alcohol | 15% – 50% | > 20% | 30% ± 10 |

The following examples are presented for purposes of illustration and not of limitation. The following formulation was employed in all examples.

|   | Component | Parts by weight |
|---|---|---|
| 1 | Nonyl phenol + 10 moles EtO | 24.4 |
| 2 | Butyl cellosolve | 12.2 |
| 3 | Tris(hydroxymethyl) amino methane + 76 moles PrO + 33 moles EtO | 34.7 |
| 4 | Alfol(C$_{8-10}$) + 4 moles EtO + sulfamic acid | 28.7 |

The above formulation is mixed with about equal parts of water, brought to a pH of about 9 with trisodium phosphate and employed as a paraffin remover. This is Formulation A.

In the examples BOD means barrels of oil per day and I.D. means internal diameter.

EXAMPLE 1

A pumping well having a low fluid level and a paraffin problem was down hole treated by the batchwise addition of Formulation A premixed with ambient temperature produced water at the ratio of 1 gallon of Formulation A to 1 barrel of water. A 10-barrel treatment successfully solved the paraffin problem in the well as evidenced by a 60% increase in the daily oil production and about 300% increase in gas production.

EXAMPLE 2

A pumping well having a high fluid level and a paraffin problem was down hole treated by the batchwise addition of Formulation A premixed with ambient temperature produced water at the ratio of 10 gallons of Formulation A to 10 barrels of water. This 10-barrel treatment was circulated with the produced fluids down the well annulus for 24 hours. Then the production from the well was returned to the flowline and was visually observed to carry considerable amounts of paraffin particles. A dynamometer test indicated the load on the rods was significantly less after the treatment.

EXAMPLE 3

A pumping well with high fluid level that produced through a flowline that had paraffin accumulations amounting to ½ inch was down hole treated batchwise with the addition of Formulation A premixed with ambient temperatured produced water at the rate of 1 gallon Formulation A to 1 barrel of produced water. A 10barrel treatment was added while the well was pumping and within 3 hours the flowline pressure at the well head dropped from 65 psi to the normal 25 psi.

EXAMPLE 4

A transfer line that was 3 inches nominal I.D. and 4,000 ft. long had a paraffin problem that was revealed by 1) a visual inspection of the line 1,000 ft. from the pumping station and 2) high operating pressures. This line was treated from the pumping station with Formulation A premixed with fresh water at 140° F. at the ratio of 1 gallon Formulation A to 1 barrel water. Because the capacity of the line was severely reduced the 40-barrel treatment proceeded slowly at first. When 20 barrels had beed added, the treatment addition rate was increased to one barrel per minute. The line was cut and reinspected and found to be clean to bright metal.

EXAMPLE 5

A flowing well having paraffin deposits in the flowline was treated by shutting in the well and injecting into the flowline at the well head Formulation A premixed with bay water at the ratio of 1 gallon of Formulation A to 1 barrel water. A 10-barrel treatment was heated to 130° F., injected into the flowline, then allowed to soak for one hour before returning the well to production. Paraffin was removed as evidenced by a reduction in flowline pressure.

EXAMPLE 6

A gas lift well averaging 73 BOD producing through an 8,000 ft. 2 inch I.D. nominal flowline was weekly downhole treated by the batchwise addition of Formulation A premixed with bay water at the ratio of 10 gallons of Formulation A to 10 barrels water. A 10-barrel treatment was pressured down the tubing at a rate that allowed a plug flow down the tubing. The treatment mixture was preheated to 180° F. During the treatment period, the production increase averaged 38 BOD.

EXAMPLE 7

A flowing well which had a paraffin problem in the tubing and flowline was treated by injecting into the tubing 10 gallons of formulation A premixed with 10 barrels of water heated to 200° F. The well was immediately returned to production. To check for paraffin removal, a wireline cutter tool was dropped into the tubing and paraffin was not found.

Other methods of applying the principle of this invention may be employed instead of those described herein, changes being made as regards the materials and methods disclosed herein, provided the steps or compositions set forth in any of the following claims, or the equivalent of such steps or compositions, are employed or obtained.

For example, other basic materials besides trisodium phosphate may be employed to obtain the basic pH> about 7 such as about 8–12 but preferably about 9, such as NaOH, KOH, etc., as well as organic bases such as amines, alkanolamines such as ethanolamine, etc. In addition, the anionic group on the oxyalkylated material may be other than sulfate or be derived from other than sulfamic acid, for example, the anionic group may be phosphate obtained for example by reacting the terminal OH group with $P_2O_5$; or the sulfate group may be derived from $SO_3$, etc. The term paraffin also includes other related deposits described herein. Other variations or modifications will be evident to those skilled in the art.

I claim:

1. A composition for removing depositions of paraffin wax, asphaltic and bituminous organic solids and similar materials comprising a basic solution of oxyalkylated materials wherein (A) at least one of said oxyalkylated materials is an oxyalkylated amine and one other of said oxyalkylated materials is (B) a sulfated oxyalkylated fatty alcohol or salt thereof, which composition contains in addition to (A) and (B) a mixture of non-ionic oxyalkylates one of which is (C) an oxyalkylated alkyl phenol, each alkyl group having 1 to 18 carbon atoms, and the other of which is (D) ethylene glycol monobutyl ether, said oxyalkylated amine (A) being the product of oxyalkylation of an oxyalkylatable amine containing as the oxyalkylatable groups an oxyalkylatable amino or hydroxyl group, the amine being selected from the group consisting of
   1. monoamines containing a monovalent hydrocarbon radical, a furyl, pyranyl, hydrogenated furyl or hydrogenated pyranyl radical attached to the amino nitrogen, any remaining valences of the amino nitrogen being satisfied by hydrogen,
   2. piperidine, piperazine, or morpholine,
   3. a polyamine of the formula

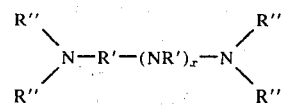

where $R''$ is hydrogen, alkyl, cycloalkyl, aryl or aralkyl, $R'$ is a divalent alkylene radical of up to 6 carbon atoms and $x$ is a number from 0 to 8, and
   4. a monoacylated polyamine of the formula $$RCONHR'(NR')_x-NH_2$$

where RCO is the acyl group of a 10 to 18 carbon fatty acid or is abietyl CO, and $R'$ and $x$ are as defined in (3) above, or such an amine containing a hydroxyl group and wherein the range of proportions of the components is as follows:
   A. oxyalkylated amine, 15%–65%
   B. sulfated oxyalkylated fatty alcohol, 15%–50%
   C. oxyalkylated phenol, 15%–50%, and
   D. ethylene glycol monobutyl ether, 5%–30%.

2. The composition of claim 1 where the oxyalkylated amine is an oxyalkylated alkanolamine.

3. The composition of claim 2 where the alkanolamine is tris (hydroxymethyl) amino methane and the sulfate group is derived from treating the oxyalkylated fatty alcohol with sulfamic acid.

4. A composition for removing depositions of paraffin wax, asphaltic and bituminous organic solids and similar materials comprising a basic solution of an oxyalkylated alcohol of up to 18 carbon atoms which is an oxyalkylated alkanol, an oxyalkylated alkenol or an oxyalkylated alkane polyol, an oxyalkylated alkyl phenol, each alkyl group having from 1 to 18 carbon atoms, a sulfated oxyalkylated fatty alcohol and an oxyalkylated tris (hydroxymethyl) amino methane, the alcohol which is oxyalkylated to form said oxyalkylated alcohol of up to 18 carbon atoms being hydrocarbon apart from the alcoholic hydroxyl, and wherein the range of proportions of the components is: oxyalkylated alkyl phenol, 15 to 50%, oxyalkylated alcohol of up to 18 carbon atoms, 5–30%, oxyalkylated tris (hydroxymethyl) amino methane, 15–65%, and sulfated oxyalkylated fatty alcohol, 15–50%.

5. The composition of claim 4 which contains ethylene glycol monobutyl ether.

6. The composition of claim 5 where the basic material is trisodium phosphate.

7. The composition of claim 6 where the oxyalkylated phenol is obtained by oxyalkylating nonyl phenol with 10 moles of ethylene oxide, the oxyalkylated tris (hydroxymethyl) amino methane is obtained by reacting 76 moles of propylene oxide and 33 moles of ethylene oxide with the tris (hydroxymethyl) amino methane, and the sulfated oxyalkylated alcohol is the sulfation product of the product of reaction of 4 moles of ethylene oxide with a $C_{8-10}$ fatty alcohol.

8. The composition of claim 5 where the basic material is an amine.

9. The composition of claim 8 where the basic material is ethanolamine.

10. A process of removing paraffin deposits from oil wells, pipe lines and conduits which comprises contacting the deposits with the composition of claim 1.

11. A process for removing paraffin deposits from oil wells, pipe lines and conduits which comprises contacting the deposits with the composition of claim 4.

12. The process of removing paraffin deposits from oil wells, pipe lines and conduits which comprises contacting the deposits with the composition of claim 6.